United States Patent [19]

Noding

[11] Patent Number: 4,661,565

[45] Date of Patent: Apr. 28, 1987

[54] UNIFORMLY CROSSLINKED POLYESTERS

[75] Inventor: Stephen A. Noding, Brusly, La.

[73] Assignee: The Dow Chemical Company, Midland, Mich.

[21] Appl. No.: 840,107

[22] Filed: Mar. 17, 1986

[51] Int. Cl.$^4$ .............................................. C08G 63/76
[52] U.S. Cl. ................................... 525/437; 528/176; 528/272
[58] Field of Search ................. 525/437; 528/272, 176

[56] References Cited

U.S. PATENT DOCUMENTS 4,065,440 12/1977 Serres ................................... 525/437
4,361,695 11/1982 DiBattista et al. ............. 528/176 X Primary Examiner—Lucille M. Phynes
Attorney, Agent, or Firm—D. R. Howard

[57] ABSTRACT

This invention relates to a new uniformly crosslinked polymer having the formula:

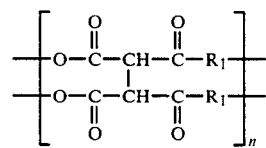

wherein $R_1$ is an alkylene, a cycloalkylene, an alkenylene, an alkynlene or a p-arylene and n is a whole integer greater than 1 and less than 100,000.

8 Claims, No Drawings

UNIFORMLY CROSSLINKED POLYESTERS

BACKGROUND OF THE INVENTION

This invention relates to a new uniformly crosslinked polyester.

Removal of molecularly-sized material from a fluid can be effected by filter-medium filtration. The filter used has pores, i.e., lattice vacancies, which are sized to trap the material to be removed, while, at the same time, allowing the desired fluid to pass therethrough. To provide high fidelity in filtration, it is important that the pores be uniformly sized—as without uniformity, the desired entrapment and/or flow of fluid through the filter are both compromised.

While uniform pore size is strived for, such uniformity is difficult and costly to achieve in those filters which are used for removing very small sized particles, i.e., those particles having an average maximum dimension between 25 and 50 angstroms. In some cases, however, removal of these smaller particles is compelled, e.g., in providing drinking water from water sources which contain naturally occurring toxins or into which industrial effluents have been discharged.

It is proposed that such small particle filters can be fabricated from a membrane comprised of a material having a molecular structure which is uniform and which has the lattice vacancies of the needed size. It is therefore an object of the invention to provide such a material. It is a further object of this invention to provide a novel uniformly crosslinked polyester.

THE INVENTION

This invention relates to a novel, uniformly crosslinked polyester polymer of the formula:

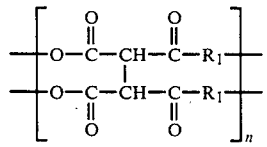

wherein $R_1$ is an alkylene, a cycloalkylene, an alkenylene, an alkynlene or a p-arylene and n is a whole integer greater than 1 and less than 100,000 and preferably within the range of from about 1000 to 100,000. The crosslinking of the polymer chains,

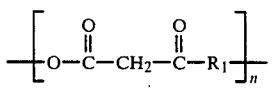

is highly biased to occur between the methylenic carbons of the malonic acid chain constituent due to the high acidity of the hydrogen associated with these carbons. Thus, substantially all of the crosslinking bonds are only found between the methylenic carbons. As a result, there is high molecular structure uniformity in the resultant crosslinked polymer. The molecular-sized pores are all substantially of the same size as there is little, if any, other crosslinking to occur between the atoms present in the repeating $R_1$ groups.

The polymer chains can be produced by conventional acid catalyzed esterification reactions between malonic acid and the appropriate diol, the latter being chosen to provide the selected $R_1$ chain constituent. For example, if $R_1$ is an alkylene, then the following exemplary diols, diethylene glycol, trimethylene glycol, propylene glycol, 1,6-hexanediol and 1,4-butanediol, can be used to produce, respectively, polyethylene malonate, polytrimethylene malonate, polypropylene malonate, polyhexylene malonate and polybutylene malonate. The presence in the polymer chains of ringed $R_1$ constituents, be they saturated or unsaturated, is also easily accomplished by esterification reactions as represented by the following pairs of diol used and $R_1$ constituent found in the resultant polymer chain—hydroquinone/polyphenylene malonate; 1,4-naphthahydroquinone/polynaphthylene malonate; 9,10-anthrahydroquinone/polyanthralene malonate; and 1,4-cyclohexanediol/polycyclohexylene malonate.

The esterification reactions, as mentioned, are conventional and generally include providing equimolar amounts of malonic acid and the selected diol to a stirred reaction vessel. A solvent such as benzene is used to shift the reaction equilibrium to the right by forming an azeotrope with the by-product water which can then be removed by heat from the reaction mixture. Acid catalyzation is achieved by adding to the reaction solution an acid, such as aqueous 5% sulfuric acid. The reaction mix is slowly heated to 80° C. until all the benzene-water azeotrope is removed. The remaining solution contains the esterification product.

To achieve the uniform crosslinked polyester of this invention, the polyester produced by the just-described esterification is first dissolved in a solvent, such as anhydrous acetonitrile, benzonitrile, etc. To this solution is added an electrolyte capable of providing an iodine ion in solution. Suitable electrolytes are KI, NaI and tetrabutylammonium iodide. The resultant solution is then placed in an electrochemical cell having a high density, low porosity graphite anode and a suitable cathode. The graphite anode can be of a material supplied by Ultra-Carbon Corporation, P.O. Box 1337, Sherman, Tex., and marketed under the name YU6OST. A current density, less than about 125 mA/in$^2$, and preferably within the range of from about 10 mA/in$^2$ to about 50 mA/in$^2$ is passed between the electrodes. A stringy material will begin to form on the cathode. It is this material which is the uniformly crosslinked polyester of this invention. This crosslinking procedure occurs conveniently at room temperature and atmospheric pressure. The heating of the solution in the electrochemical cell due to electrolysis is insignificant, thus there is little need for heat removal equipment.

Quantitatively, the polyester, electrolyte and solvent solution can vary widely. For example, the polyester may be added to the solvent to provide a molar concentration within the range of from about 0.001M to about 0.01M. The iodine ion providing electrolyte may be present in a molar concentration within the range of from about 0.1M to about 1.0M.

EXAMPLE I

Malonic acid (0.1 moles, 10.416 g) ethylene glycol (0.1 moles, 6.207 g), a drop of aqueous 5% sulfuric acid, 100 ml of benzene, and a magnetic stirring bar were placed into a 250 ml three-necked round bottom flask. A thermometer, stopper, and a Dean-Stark trap with a condensor were attached to the flask which was fitted into a heating mantle and placed on top of a magnetic stirrer. The mixture was slowly heated to 80° C. with stirring until all of the benzene-water azeotrope was removed (approximately 120 mins). Afterwards, the solution was cooled under nitrogen and analyzed by NMR and GLC. A 97% yield of polyethylene malonate was isolated.

Ten grams of the resultant isolated polyethylene malonate was then dissolved in anhydrous acetonitrile. Potassium iodide (1 g) was also added to the solution. The solution was transferred to an electrochemical cell. The anode was constructed from non-porous graphite, and the cathode was a sheet of platinum. A current density of 100 mA/in$^2$ was applied to the electrodes. Immediately, a stringy material began to be deposited on the cathode. It had the appearance of Spanish moss. The voltage and current applied to the electrodes was continuously monitored. When the cell voltage rose (from 3.5 volts to 13 volts) at constant current. The current was turned off and the deposit was carefully removed from the cathode, washed with deionized water, and allowed to air dry. This procedure was repeated several times until the initial voltage as noted to be high, indicating no further capacity for the system to react. The deposits were weighed and compared against the calculated weight for that time period needed to complete crosslinking between the methylenic carbon atoms of the malonic acid constituents of the polyethylene malonate chains. The calculated weight was within 10% of the observed weight. The small discrepancy in weights was believed to be the result of the effect of the growing stringy deposit on the cathode. The similarity between the observed and calculated weights shows high crosslinking at the methylenic carbon sites.

EXAMPLE II

The same procedure was followed as in Example I except that 0.1 moles, 11.01 g, of hydroquinone was used in the esterification reaction instead of the ethylene glycol and that 5 g of the resultant polyphenylene malonate were substituted for the polyethylene malonate in the solution added to the electrochemical cell. A stringy material was deposited on the cathode. The observed time of electrolysis prior to a voltage rise from 3 V to 15 V at a constant current of 100 mA/in$^2$ was approximately 30 minutes. When the voltage reached 15 V, the reaction was shut down as above and the resulting crosslinked polymer removed from the cathode, washed, dried and weighed. This procedure was repeated until 90% or 4.5 g of the crosslinked polymer was recovered. The calculated weight for crosslinking the polyphenylene malonate at the methylenic carbons of the malonic acid constituent was 5 grams. Considering the effect of the deposition of the string material on the cathode, good confirmation between the observed and calculated weights was obtained. This confirmation indicates substantially complete uniform crosslinking of the polymer chains at the methylenic carbon sites.

I claim:

1. A composition of matter having the formula:

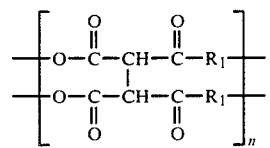

wherein $R_1$ is an alkylene, a cycloalkylene, an alkenylene, an alkynlene or a p-arylene and n is a whole integer greater than 1 and less than 100,000.

2. The composition of matter of claim 1 wherein $R_1$ is a p-arylene.

3. The composition of matter of claim 1 wherein $R_1$ is an alkylene.

4. The composition of matter of claim 1 wherein $R_1$ is ethylene.

5. The composition of matter of claim 1 wherein $R_1$ is p-phenylene.

6. The composition of matter of claim 1 wherein n is within the range of from about 1000 to about 100,000.

7. The composition of matter of claim 4 wherein n is within the range of from about 1000 to about 100,000.

8. The composition of matter of claim 5 wherein n is within the range of from about 1000 to about 100,000.

* * * * *